(12) United States Patent
Suzuki

(10) Patent No.: US 8,174,585 B2
(45) Date of Patent: May 8, 2012

(54) COLOR CONVERSION COEFFICIENT CALCULATION APPARATUS, COMPUTER READABLE RECORDING MEDIUM FOR RECORDING COLOR CONVERSION COEFFICIENT CALCULATION PROGRAM, AND COLOR CONVERSION COEFFICIENT CALCULATION METHOD

(75) Inventor: Hiroshi Suzuki, Hachioji (JP)

(73) Assignee: Olympus Corporation, Tokyo (JP)

( * ) Notice: Subject to any disclaimer, the term of this patent is extended or adjusted under 35 U.S.C. 154(b) by 80 days.

(21) Appl. No.: 12/791,124

(22) Filed: Jun. 1, 2010

(65) Prior Publication Data

US 2010/0238329 A1 Sep. 23, 2010

Related U.S. Application Data

(63) Continuation of application No. PCT/JP2008/072017, filed on Dec. 4, 2008.

(30) Foreign Application Priority Data

Dec. 6, 2007 (JP) ................................. 2007-316123

(51) Int. Cl.
*H04N 17/02* (2006.01)
*H04N 5/228* (2006.01)
*H04N 5/335* (2006.01)
*H04N 9/04* (2006.01)
*G06K 9/00* (2006.01)
*G03F 3/08* (2006.01)
*G09G 5/02* (2006.01)

(52) U.S. Cl. ..................... 348/223.1; 348/188; 348/273; 382/167; 358/518; 345/600

(58) Field of Classification Search .................. 348/118, 348/223.1, 225.1, 273, 280, 281, 188; 382/167; 358/518; 345/589, 591, 600, 603, 604
See application file for complete search history.

(56) References Cited

U.S. PATENT DOCUMENTS 5,668,596 A * 9/1997 Vogel .......................... 348/222.1
(Continued)

FOREIGN PATENT DOCUMENTS

JP 2001-358960 A 12/2001
(Continued)

OTHER PUBLICATIONS

Int. Search Report dated Mar. 10, 2009 PCT/JP2008/072017 (in both English and Japanese).

*Primary Examiner* — John Villecco

(74) *Attorney, Agent, or Firm* — Holtz, Holtz, Goodman & Chick, P.C.

(57) ABSTRACT

A color conversion coefficient calculation apparatus includes: a conversion coefficient calculation section that calculates, as a color conversion coefficient for converting a first color signal made up of a plurality of chrominance signals into a second color signal made up of a plurality of chrominance signals, a color conversion coefficient for converting a first spectral characteristic which characterizes the first color signal in a standard fashion into a second spectral characteristic which characterizes the second color signal; a correction coefficient calculation section that calculates a correction coefficient for approximating a base color signal which is the first color signal corresponding to a plurality of base colors into a reference color signal obtained based on the first spectral characteristic corresponding to a plurality of base colors; and a conversion coefficient correction section that corrects the color conversion coefficient by using the correction coefficient.

11 Claims, 5 Drawing Sheets

U.S. PATENT DOCUMENTS

| | | | |
|---|---|---|---|
| 6,320,668 B1* | 11/2001 | Kim | 358/1.1 |
| 6,542,185 B1* | 4/2003 | Bogardus | 348/223.1 |
| 6,734,899 B1* | 5/2004 | Okamoto | 348/188 |
| 7,227,571 B2* | 6/2007 | Katoh | 348/223.1 |
| 7,477,294 B2* | 1/2009 | Lohweg et al. | 348/223.1 |
| 7,570,282 B1* | 8/2009 | Kaplinsky | 348/188 |
| 7,586,521 B2* | 9/2009 | Wong | 348/222.1 |
| 7,675,551 B1* | 3/2010 | Zhou | 348/223.1 |
| 7,737,989 B2* | 6/2010 | Pettitt et al. | 345/589 |
| 7,800,698 B2* | 9/2010 | Quan et al. | 348/659 |
| 7,999,978 B2* | 8/2011 | Nakamura et al. | 358/518 |
| 2005/0018226 A1* | 1/2005 | Chiba | 358/1.9 |
| 2005/0046883 A1* | 3/2005 | Chiba | 358/1.9 |
| 2005/0146733 A1* | 7/2005 | Lohweg et al. | 358/1.9 |
| 2005/0219365 A1* | 10/2005 | DiCarlo et al. | 348/188 |
| 2006/0098096 A1* | 5/2006 | Gupta et al. | 348/188 |
| 2006/0170942 A1* | 8/2006 | Chiba | 358/1.9 |
| 2007/0263098 A1* | 11/2007 | Quan et al. | 348/222.1 |
| 2008/0007565 A1* | 1/2008 | Nogawa et al. | 345/597 |
| 2008/0218635 A1* | 9/2008 | Tsuruoka | 348/607 |
| 2009/0016602 A1* | 1/2009 | Komiya et al. | 382/167 |
| 2009/0147098 A1* | 6/2009 | Li | 348/223.1 |
| 2010/0201839 A1* | 8/2010 | Suzuki | 348/222.1 |

FOREIGN PATENT DOCUMENTS

| | | |
|---|---|---|
| JP | 2003-134536 A | 5/2003 |
| JP | 2005-117524 A | 4/2005 |
| JP | 2005-303704 A | 10/2005 |
| JP | 2006-211369 A | 8/2006 |

* cited by examiner

FIG.2
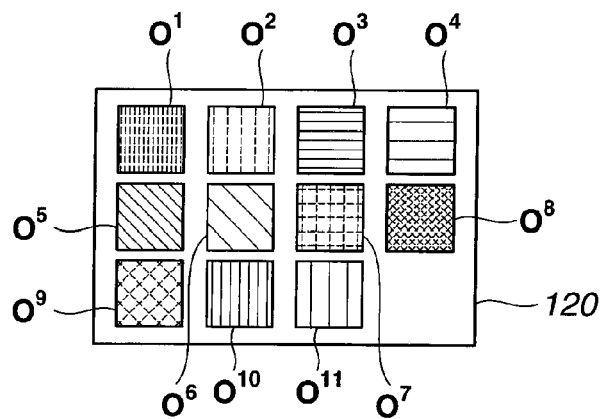
FIG.3
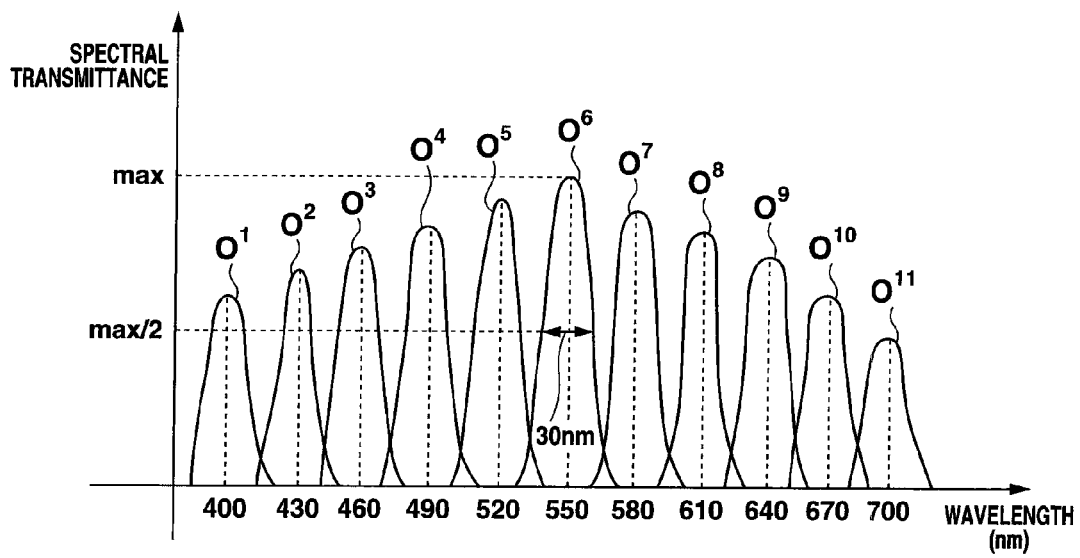
FIG.4
| R | G | R | G | R |
|---|---|---|---|---|
| G | B | G | B | G |
| R | G | R | G | R |
| G | B | G | B | G |
| R | G | R | G | R |

COLOR CONVERSION COEFFICIENT CALCULATION APPARATUS, COMPUTER READABLE RECORDING MEDIUM FOR RECORDING COLOR CONVERSION COEFFICIENT CALCULATION PROGRAM, AND COLOR CONVERSION COEFFICIENT CALCULATION METHOD

CROSS REFERENCE TO RELATED APPLICATION

This application is a continuation application of PCT/JP2008/072017 filed on Dec. 4, 2008 and claims benefit of Japanese Application No. 2007-316123 filed in Japan on Dec. 6, 2007, the entire contents of which are incorporated herein by this reference.

BACKGROUND OF THE INVENTION

1. Field of the Invention

The present invention relates to a color conversion coefficient calculation apparatus, a computer readable recording medium for recording a color conversion coefficient calculation program, and a color conversion coefficient calculation method for calculating a color conversion coefficient to convert a first color signal made up of a plurality of chrominance signals into a second color signal made up of a plurality of chrominance signals.

2. Description of the Related Art

It is known that in an image pickup apparatus such as a digital camera and the like, color reproduction may vary when the same subject is photographed in different environments. However, in reality, color reproduction may vary, without being limited to such a case, even when the same subject is photographed in the same environment.

While an image pickup apparatus is configured to use, for example, an image pickup device equipped with a color filter to pickup images, such an image pickup device equipped with a color filter has different characteristics relating to color reproduction, such as spectral characteristics, etc. depending on the type thereof. Moreover, even among image pickup devices of the same type, the characteristics thereof may differ among individuals depending on the materials and manufacturing processes thereof, and aging degradation, etc. Therefore, due to such difference in characteristics, the color reproduction in individual image pickup apparatus will vary as well. Color reproduction is regarded as one of important factors particularly in the medical field, and variation in color reproduction may possibly disturb diagnostics.

To solve such a problem, various color correction technologies have been developed in recent years; for example, a technology to perform color correction by using a fixed color correction coefficient which is not dependent on individual image pickup apparatuses is proposed. However, this technology is not yet able to cope with the differences in characteristics among individuals of an image pickup apparatus.

For example, Japanese Patent Application Laid-Open Publication No. 2001-358960 describes a technology to derive a color correction coefficient for performing a linear conversion of a signal characterized by a first spectral sensitivity distribution into a signal characterized by a second spectral sensitivity distribution based on the first spectral sensitivity distribution and the second spectral sensitivity distribution. Applying this technology to each individual image pickup apparatus allows for the derivation of an optimum color correction coefficient to absorb the difference between two spectral sensitivity distributions.

Moreover, Japanese Patent Application Laid-Open Publication No. 2005-117524 describes a technology by which a color chart is photographed for each of plural image pickup apparatuses and a color correction coefficient is derived so that image data agree with one another among photographed color charts.

SUMMARY OF THE INVENTION

A color conversion coefficient calculation apparatus according to a certain aspect of the present invention is a color conversion coefficient calculation apparatus for calculating a color conversion coefficient to convert a first color signal made up of a plurality of chrominance signals into a second color signal made up of a plurality of chrominance signals, including: a color conversion coefficient calculation section that calculates as a color conversion coefficient for converting the first color signal into the second color signal, a color conversion coefficient for converting a first spectral characteristic which characterizes the first color signal in a standard fashion into a second spectral characteristic which characterizes the second color signal; a correction coefficient calculation section that calculates a correction coefficient for approximating a base color signal which is the first color signal corresponding to a plurality of base colors into a reference color signal obtained based on the first spectral characteristic corresponding to the plurality of base colors; and a coefficient correction section that corrects the color conversion coefficient by using the correction coefficient.

A computer readable recording medium for recording a color conversion coefficient calculation program according to another aspect of the present invention is a computer readable recording medium for recording a color conversion coefficient calculation program for calculating a color conversion coefficient to convert a first color signal made up of a plurality of chrominance signals into a second color signal made up of a plurality of chrominance signals, wherein the color conversion coefficient calculation program includes: a color conversion coefficient calculation step of calculating, as a color conversion coefficient to convert the first color signal into the second color signal, a color conversion coefficient for converting a first spectral characteristic which characterizes the first color signal in a standard fashion into a second spectral characteristic which characterizes the second color signal; a correction coefficient calculation step of calculating a correction coefficient for approximating a base color signal which is the first color signal corresponding to a plurality of base colors into a reference color signal obtained based on the first spectral characteristic corresponding to the plurality of base colors; and a coefficient correction step of correcting the color conversion coefficient by using the correction coefficient.

A color conversion coefficient calculation method according to a further aspect of the present invention is a color conversion coefficient calculation method for calculating a color conversion coefficient to convert a first color signal made up of a plurality of chrominance signals into a second color signal made up of a plurality of chrominance signals, the method including: a color conversion coefficient calculation step of calculating, as a color conversion coefficient for converting the first color signal into the second color signal, a color conversion coefficient for converting a first spectral characteristic which characterizes the first color signal in a standard fashion into a second spectral characteristic which characterizes the second color signal; a correction coefficient calculation step of calculating a correction coefficient for approximating a base color signal which is the first color signal corresponding to a plurality of base colors into a reference color signal obtained based on the first spectral characteristic corresponding to the plurality of base colors; and a coefficient correction step of correcting the color conversion coefficient by using the correction coefficient.

BRIEF DESCRIPTION OF THE DRAWINGS

FIG. 2 is a diagram to show a configuration example of a color chart, in which color patches are arranged, in the Embodiment 1;

FIG. 3 is a graph to show the spectral transmittances of the color patches of the color chart in the Embodiment 1;

FIG. 4 is a diagram to show the configuration of a Bayer-type primary color filter in the Embodiment 1;

DETAILED DESCRIPTION OF THE PREFERRED EMBODIMENTS

Hereafter, embodiments of the present invention will be described with reference to the drawings.

Embodiment 1

Figure 1:
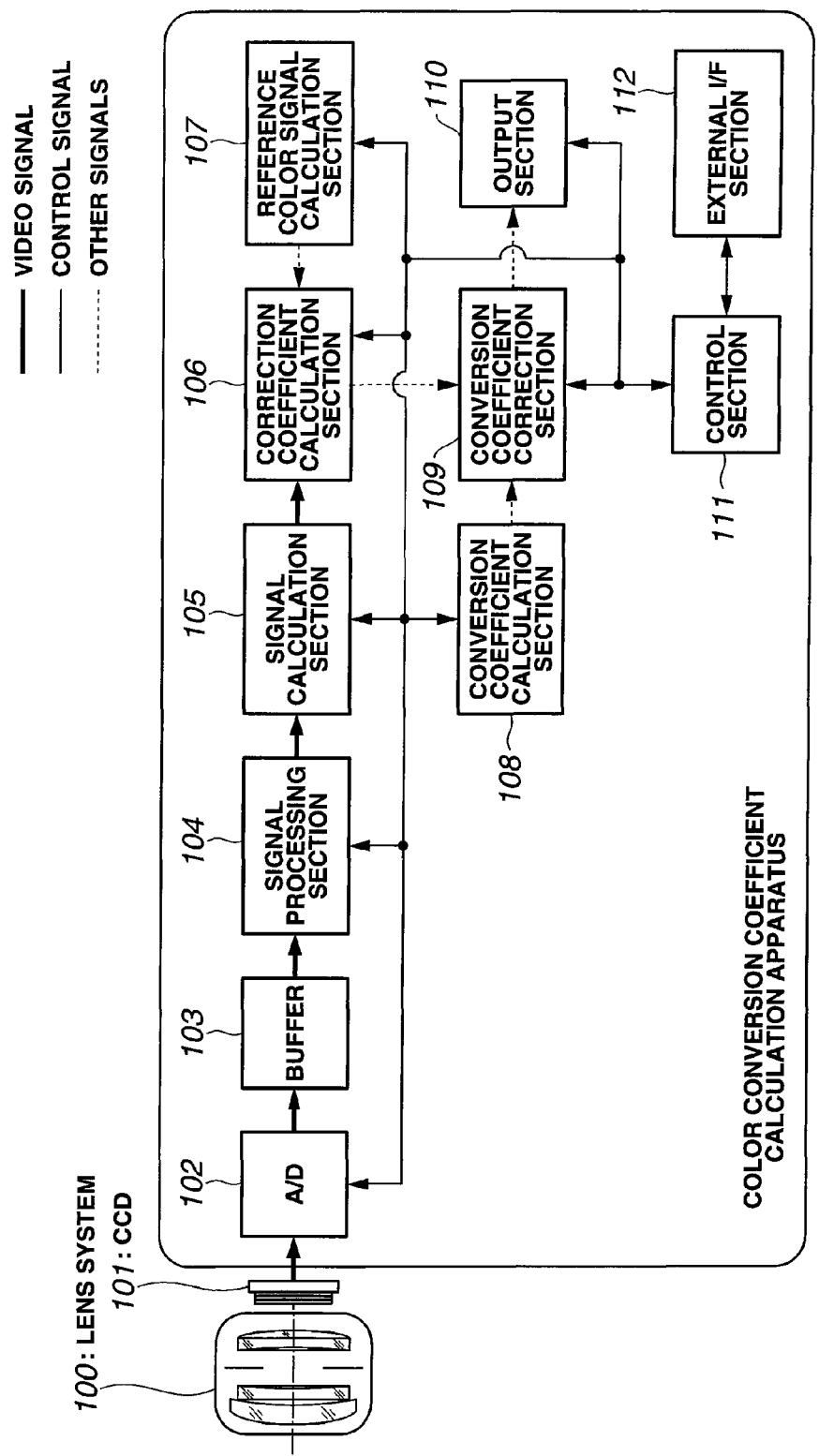
FIG. 1 is a block diagram to show the configuration of a color conversion coefficient calculation apparatus in Embodiment 1 of the present invention.
Figure 5:
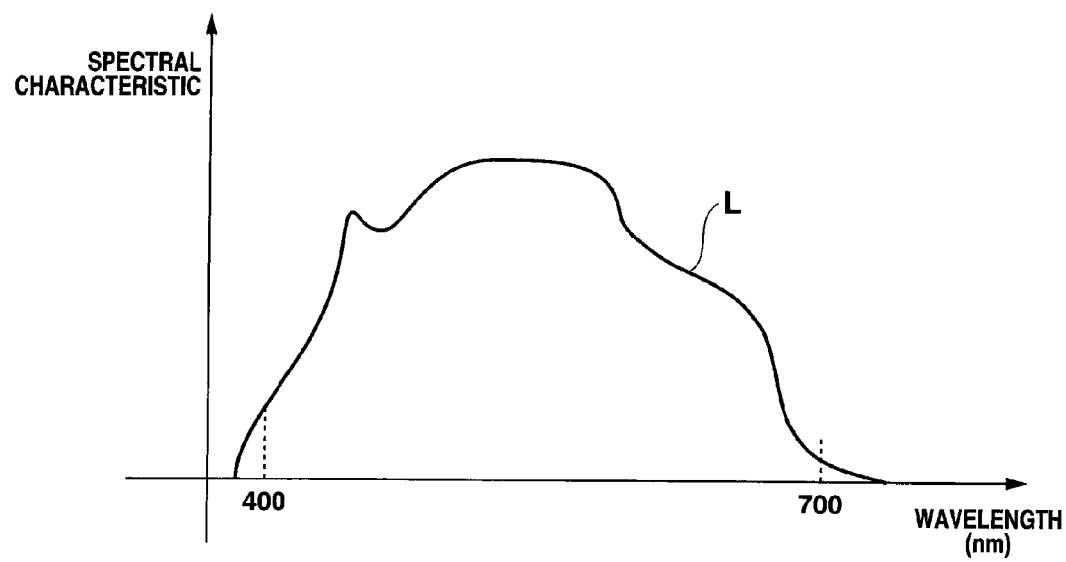
FIG. 5 is a graph to show the spectral characteristic of a light source in the Embodiment 1.
Figure 6:
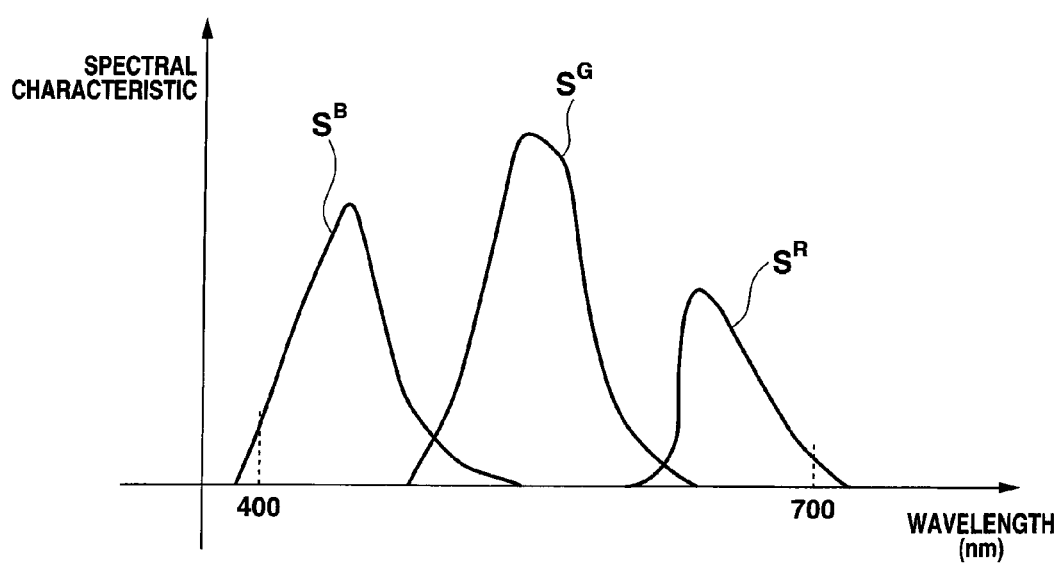
FIG. 6 is a graph to show an object's spectral characteristic of an image pickup device in the Embodiment 1.
Figure 7:
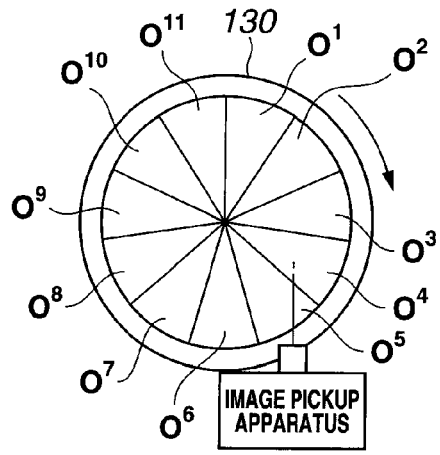
FIG. 7 is a diagram to show the configuration of a rotary filter in the Embodiment 1.
Figure 8:
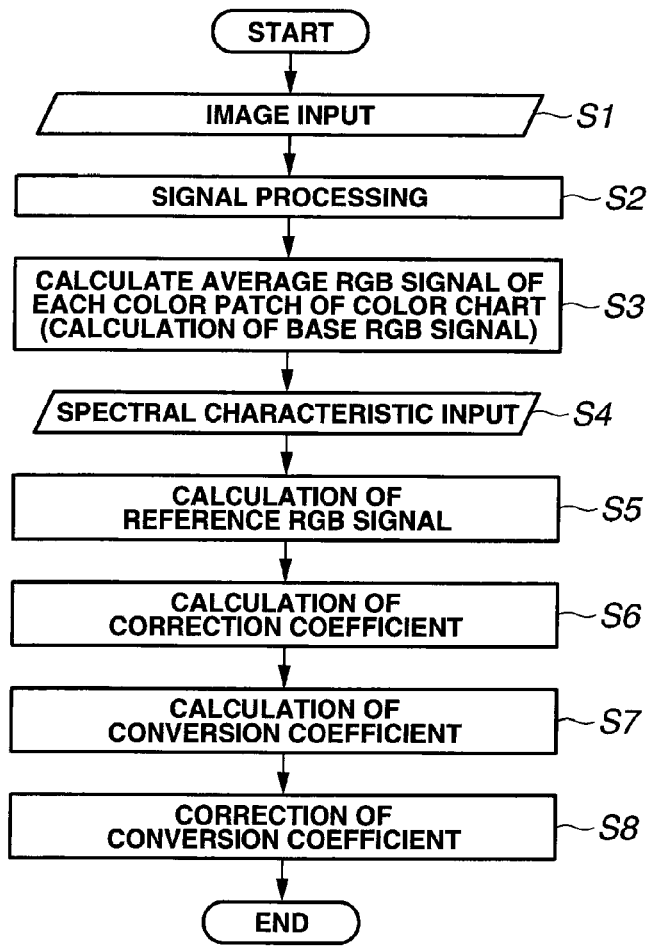
FIG. 8 is a flowchart to show the flow of the processing in the color conversion coefficient calculation method of the Embodiment 1.

FIGS. 1 to 8 show Embodiment 1 of the present invention, in which FIG. 1 is a block diagram to show the configuration of a color conversion coefficient calculation apparatus, FIG. 2 is a diagram to show a configuration example of a color chart in which color patches are arranged, FIG. 3 is a graph to show the spectral transmittances of the color patches of the color chart, FIG. 4 is a diagram to show the configuration of a Bayer-type primary color filter, FIG. 5 is a graph to show the spectral characteristic of a light source, FIG. 6 is a graph to show object's spectral characteristics of an image pickup device, FIG. 7 is a diagram to show the configuration of a rotary filter, and FIG. 8 is a flowchart to show the flow of the processing in a color conversion coefficient calculation method.

First, referring to FIG. 1, the configuration of a color conversion coefficient calculation apparatus will be described. Here, the color conversion coefficient calculation apparatus of the present embodiment is equipped with an image pickup system, and is adapted to pick up an image of a color chart 120 (see FIG. 2), in which a plurality of color patches as described later are arranged, to calculate a color conversion coefficient for the equipped image pickup system based on the video signal obtained by image pickup. Therefore, FIG. 1 shows the image pickup system as well.

First, the image pickup system includes a lens system 100 and a CCD 101.

Further, the color conversion coefficient calculation apparatus is configured to include an A/D conversion section 102, a buffer 103, a signal processing section 104, a signal calculation section 105, a correction coefficient calculation section 106, a reference color signal calculation section 107, a conversion coefficient calculation section 108 which is a color conversion coefficient calculation section, a conversion coefficient correction section 109 which is a coefficient correction section, an output section 110, a control section 111, and an external I/F section 112 which is a spectral characteristic input section.

The lens system 100 is for forming an optical image of a subject onto a CCD 101 and makes up an image pickup section.

The CCD 101 is an image pickup device that photoelectrically converts an optical image formed by the lens system 100 to output a video signal, and makes up the image pickup section. The CCD 101 is connected to the A/D conversion section 102.

The A/D conversion section 102 is connected to the output section 110 via the buffer 103, the signal processing section 104, the signal calculation section 105, the correction coefficient calculation section 106, and the conversion coefficient correction section 109, in this order. Moreover, the reference color signal calculation section 107 is connected to the correction coefficient calculation section 106. The conversion coefficient calculation section 108 is connected to the conversion coefficient correction section 109.

The control section 111 is bidirectionally connected with the A/D conversion section 102, the signal processing section 104, the signal calculation section 105, the correction coefficient calculation section 106, the reference color signal calculation section 107, the conversion coefficient calculation section 108, the conversion coefficient correction section 109, the output section 110, and the external I/F section 112, and adapted to control the same.

The A/D conversion section 102 converts an analog video signal outputted from the CCD 101 into a digital video signal.

The buffer 103 temporarily stores the digital video signal converted by the A/D conversion section 102.

The signal processing section 104 applies signal processing such as a 3-color signal generation, a brightness correction, and the like to the video signal transferred from the buffer 103.

The signal calculation section 105 calculates an average RGB signal for each color patch of the color chart 120 as a base RGB signal (a base color signal) based on the video signal transferred from the signal processing section 104.

The reference color signal calculation section 107 calculates a reference RGB signal (reference color signal) corresponding to the base RGB signal based on the object's spectral characteristic, the spectral characteristic of a light source, and the spectral transmittance (spectral characteristic) of the color patch, which are inputted from the external I/F section 112 as described later.

The correction coefficient calculation section 106 accepts a reference RGB signal from the reference color signal calculation section 107 and calculates a correction coefficient based on the accepted reference RGB signal and the base RGB signal transferred from the signal calculation section 105.

The conversion coefficient calculation section 108 calculates a conversion coefficient based on an object's spectral characteristic and a target spectral characteristic, which are imputed from the external I/F section 112 as described below.

The conversion coefficient correction section 109 corrects the conversion coefficient transferred from the conversion coefficient calculation section 108 by using the correction coefficient transferred from the correction coefficient calculation section 106.

The output section 110 stores the conversion coefficient after correction, which is transferred from the conversion coefficient correction section 109, in a recording medium such as, for example, a memory card, and the like.

The control section 111 is made up of, for example, a micro computer and centrally controls the entire color conversion coefficient calculation apparatus.

The external I/F section 112 is an interface that includes a power source switch, a shutter button, an input device for inputting information of spectral characteristics (an object's spectral characteristic, a target spectral characteristic, a spectral characteristic of a light source, and a spectral transmittance of the color patch, which will be described below), and the like.

Next, the operation of the color conversion coefficient calculation apparatus as shown in FIG. 1 will be described along the flow of signal.

First, an image pickup system, which is to be the object for the calculation of a color conversion coefficient, is attached to the color conversion coefficient calculation apparatus. In the configuration as shown in FIG. 1 of the present embodiment, the image pickup system which is to be the object for the calculation of a color conversion coefficient is an image pickup system made up of a lens system 100 and a CCD 101.

Next, a representative spectral characteristic of the model of the image pickup device which is to be the object for the calculation of a color conversion coefficient (a spectral characteristic which characterizes, in a standard fashion, the color signal obtained by the image pickup device which is to be the object for the calculation of a color conversion coefficient) (for example, a spectral characteristic listed in a catalog etc., and hereafter referred to as an object's spectral characteristic); a spectral characteristic of the image pickup device which is to be the target of color reproduction (hereafter, referred to as a target spectral characteristic); spectral transmittances of the color patches; and a spectral characteristic of the light source that illuminates the color patches are inputted through the external I/F section 112.

Further, a color chart 120 is placed at a position where image pickup is possible by the lens system 100, so as to be perpendicular to the optical axis of the lens system 100, and photographing of the color chart 120 is performed by pressing a shutter button of the external I/F section 112.

Here, in the present embodiment, the color chart 120 is assumed to be a transmission-type color chart in which a plurality of color patches that allow a light of a predetermined certain narrow-band wavelength to pass through. Decreasing the wavelength bandwidth of the spectral transmittance of the color patches makes it possible to extract with high precision the features of the distribution profile of the spectral characteristic of the image pickup device.

To be specific, the color chart 120 is configured, as shown in FIG. 2, by arranging in plane 11 color patches having spectral transmittances of $O^1$ to $O^{11}$ each corresponding to a base color. Each of the spectral transmittances $O^1$ to $O^{11}$ is as shown in FIG. 3. That is, each spectral transmittance $O^1$ to $O^{11}$ is configured such that each peak wavelength is spaced at an interval of 30 nm within a wavelength range of 400 nm to 700 nm. Further, it is assumed that the spectral transmittance of each color patch takes on an angle-shaped distribution profile having a full width at half maximum of 30 nm. It is noted that without being necessarily limited to the color patch having a full width at half maximum of 30 nm, a color patch having an arbitrary full width at half maximum may also be utilized.

When photographing is performed using such transmission-type color chart 120, a light box light source is placed on the back side of the color chart 120 to emit light. As a result of this, light is radiated from the back side of the color chart 120 toward the lens system 100 and the CCD 101.

Then, an optical image of the color chart 120 is formed on the CCD 101 via the lens system 100, and a photoelectric conversion is performed by the CCD 101 so that a video signal is outputted. It is noted that in the present embodiment, the CCD 101 is assumed to be a single-board CCD equipped with a Bayer-type primary color filter.

Where the Bayer-type primary color filter is configured such that with 2 by 2 pixels as a base unit as shown in FIG. 4, two G(green) pixels are disposed in a diagonal direction, and one R(red) pixel and one B(blue) pixel are disposed respectively in the two pixels in the remaining diagonal direction.

The video signal from the CCD 101 is converted into a digital signal by the A/D conversion section 102 and is temporarily stored in a buffer 103. Therefore, the video signal stored in the buffer 103 via the A/D conversion section 102 is an RGB signal (RGB Bayer signal) in which only one color signal of an R signal, a G signal, and a B signal is obtained for one pixel. The RGB signal in the buffer 103 is transferred to the signal processing section 104.

The signal processing section 104 generates an RGB signal of a 3-plate state (that is, an RGB signal in which all of an R signal, a G signal, and a B signal are available in one pixel) by performing a known interpolation processing. Further, the signal processing section 104 performs signal processing, such as a brightness correction, on the RGB signal of a 3-plate state. The video signal processed by the signal processing section 104 is transferred to a signal calculation section 105.

The signal calculation section 105 calculates an average RGB signal (an average R signal, an average G signal, and an average B signal) (where this average RGB signal is supposed to be a base RGB signal) for each color patch of the color chart 120 as shown in FIGS. 2 and 3 from the RGB signal transferred from the signal processing section 104, and transfers a calculated base RGB signal to the correction coefficient calculation section 106.

The reference color signal calculation section 107 calculates a reference RGB signal corresponding to the base RGB signal based on the object's spectral characteristic, the spectral characteristic of the light source, and the spectral transmittance of the color patch, which are inputted from the external I/F section 112 and transferred via the control section 111, and transfers the calculated reference RGB signal to the correction coefficient calculation section 106.

The correction coefficient calculation section 106 calculates a correction coefficient based on the reference RGB signal transferred from the reference color signal calculation section 107 and the base RGB signal transferred from the signal calculation section 105. The correction coefficient calculation section 106 transfers the calculated correction coefficient to the conversion coefficient correction section 109.

The conversion coefficient calculation section 108 calculates a conversion coefficient (a conversion coefficient for performing a conversion to approximate an RGB signal obtained by an image pickup device having a representative spectral characteristic of the same model with the image pickup device which is to be an object for the calculation of a color conversion coefficient into an RGB signal obtained by an image pickup device which is to be the target of color reproduction) based on the object's spectral characteristic and the target spectral characteristic, which are inputted from the external I/F section 112 and transferred via the control section 111, and transfers the calculated conversion coefficient to the conversion coefficient correction section 109.

Here, it is assumed that the object's spectral characteristic which is to be inputted via the external I/F section 112 as described above is a spectral characteristic which represents the model of the CCD 101. To be specific, for example, a spectral characteristic listed in a catalog can be used as described above. It is noted that the representative spectral characteristic is not limited to a spectral characteristic listed in a catalog; and for example, a spectral characteristic of a certain individual CCD belonging to the model adopted as the CCD 101 may be actually measured so that the spectral characteristic obtained as the measurement result is used.

On the other hand, the target spectral characteristic may either be a spectral characteristic obtained by an actual measurement of the image pickup device which is to be the target of color reproduction, or a spectral characteristic listed in a catalog.

The conversion coefficient correction section 109 corrects the conversion coefficient transferred from the conversion coefficient calculation section 108 based on the correction coefficient transferred from the correction coefficient calculation section 106.

The output section 110 records and stores the conversion coefficient after correction transferred from the conversion coefficient correction section 109 in a recording medium such as a memory card and the like.

Next, the operation of the reference color signal calculation section 107 will be described.

The reference color signal calculation section 107 calculates a reference RGB signal based on an object's spectral characteristic, a spectral characteristic of the light source, and spectral transmittances of the color patches, which are inputted from the external I/F section 112 via the control section 111.

The reference RGB signal, which corresponds to a base RGB signal, is obtained by respectively multiplying a spectral characteristic (FIG. 5) of the light box type light source which is measured in advance, an object's spectral characteristic (FIG. 6) listed in a catalog etc. of the image pickup device which is to be the object of color reproduction, and the spectral transmittance (FIG. 3) of each color patch of the color chart 120, for each wavelength component, and adding them up with respect to a wavelength band of interest (400 nm to 700 nm). Specifically, the calculation of the reference RGB signal is performed as shown in the following Expression 1.

$$R_i^S = \sum_{\lambda=400}^{700} S_\lambda^R \cdot L_\lambda \cdot O_\lambda^i \quad \text{[Expression 1]}$$

$$G_i^S = \sum_{\lambda=400}^{700} S_\lambda^G \cdot L_\lambda \cdot O_\lambda^i$$

$$B_i^S = \sum_{\lambda=400}^{700} S_\lambda^B \cdot L_\lambda \cdot O_\lambda^i$$

Where $R_i^S$, $G_i^S$, and $B_i^S$ indicate a reference RGB signal; reference character i indicates the identification number of a color patch of the color chart 120; $S_\lambda^R$, $S_\lambda^G$, and $S_\lambda^B$ indicate object's spectral characteristics listed in a catalog etc. of the respective R pixel, G pixel, and B pixel of the image pickup device which is to be the object of color reproduction; $L_\lambda$ indicates a spectral characteristic of the light source; and $O_\lambda^i$ indicates the spectral transmittance of the color patch i, respectively.

In the above description, $\lambda$ represents a wavelength and it is assumed that each spectral characteristic described above is obtained through a sampling at an interval of 10 nm in a wavelength range of 400 nm to 700 nm. Moreover, when the total number of color patches is supposed to be n, a possible range the identification number i of the color patch of the color chart 120 can take is 1 to n, and n is 11 in the present embodiment as shown in FIGS. 2 and 3.

The reference RGB signal calculated by the reference color signal calculation section 107 is outputted to the correction coefficient calculation section 106.

Next, the operation of the correction coefficient calculation section 106 will be described in detail.

The correction coefficient calculation section 106 calculates a correction coefficient (correction matrix coefficients), for example, as shown in the following Expression 2, by a least square method between a reference RGB signal and a base RGB signal based on the reference RGB signal transferred from the reference color signal calculation section 107 and the base RGB signal transferred from the signal calculation section 105.

$$\min \sum_{i=1}^{n} |R_i^S - (a_1 \cdot R_i^O + a_2 \cdot G_i^O + a_3 \cdot B_i^O)|^2 \quad \text{[Expression 2]}$$

$$\min \sum_{i=1}^{n} |G_i^S - (a_4 \cdot R_i^O + a_5 \cdot G_i^O + a_6 \cdot B_i^O)|^2$$

$$\min \sum_{i=1}^{n} |B_i^S - (a_7 \cdot R_i^O + a_8 \cdot G_i^O + a_9 \cdot B_i^O)|^2$$

Where, $R_i^O$, $G_i^O$, and $B_i^O$ indicate a base RGB signal, and $a_1$ to $a_9$ indicate correction matrix coefficients.

Such correction matrix coefficients serve to absorb the difference between the spectral characteristic of the image pickup device of a catalog used for the calculation of the reference RGB signal, and the spectral characteristic of the image pickup device which is actually used for the photographing of the color chart 120 (that is, individual differences which may arise even within the same model).

The correction matrix coefficients $a_1$ to $a_9$ thus calculated by the correction coefficient calculation section 106 are transferred to the conversion coefficient correction section 109.

It is noted that although, in Expression 2, calculation is performed on the assumption that the correction matrix coefficients are linear matrix coefficients of 3 by 3, they may be matrix coefficients which include higher order terms (non-linear terms) of $R_i^O$, $G_i^O$, and $B_1^O$. In this case as well, the higher order matrix coefficients are calculated by a least square method as well as in the case of linear matrix coefficients. That is, the calculation of higher order matrix coefficients can be performed for example as shown in the following Expression 3.

$$\min \sum_{i=1}^{n} \left| R_i^S - \begin{pmatrix} b_{11} \cdot R_i^O + b_{12} \cdot G_i^O + b_{13} \cdot B_i^O + \\ b_{14} \cdot R_i^O \cdot G_i^O + b_{15} \cdot G_i^O \cdot B_i^O + b_{16} \cdot B_i^O \cdot \\ R_i^O + b_{17} \cdot R_i^{O^2} + b_{18} \cdot G_i^{O^2} + b_{19} \cdot B_i^{O^2} \end{pmatrix} \right|^2 \quad \text{[Expression 3]}$$

$$\min \sum_{i=1}^{n} \left| G_i^S - \begin{pmatrix} b_{21} \cdot R_i^O + b_{22} \cdot G_i^O + b_{23} \cdot B_i^O + \\ b_{24} \cdot R_i^O \cdot G_i^O + b_{25} \cdot G_i^O \cdot B_i^O + b_{26} \cdot B_i^O \cdot \\ R_i^O + b_{27} \cdot R_i^{O^2} + b_{28} \cdot G_i^{O^2} + b_{29} \cdot B_i^{O^2} \end{pmatrix} \right|^2$$

-continued $$\min \sum_{i=1}^{n} \left| B_i^S - \begin{pmatrix} b_{31} \cdot R_i^O + b_{32} \cdot G_i^O + b_{33} \cdot B_i^O + \\ b_{34} \cdot R_i^O \cdot G_i^O + b_{35} \cdot G_i^O \cdot B_i^O + b_{36} \cdot B_i^O \cdot \\ R_i^O + b_{37} \cdot R_i^{O2} + b_{38} \cdot G_i^{O2} + b_{39} \cdot B_i^{O2} \end{pmatrix} \right|^2$$

$$\min \sum_{i=1}^{n} \left| R_i^S \cdot G_i^S - \begin{pmatrix} b_{41} \cdot R_i^O + b_{42} \cdot G_i^O + b_{43} \cdot B_i^O + \\ b_{44} \cdot R_i^O \cdot G_i^O + b_{45} \cdot G_i^O \cdot B_i^O + \\ b_{46} \cdot B_i^O \cdot R_i^O + b_{47} \cdot R_i^{O2} + \\ b_{48} \cdot G_i^{O2} + b_{49} \cdot B_i^{O2} \end{pmatrix} \right|^2$$

$$\min \sum_{i=1}^{n} \left| G_i^S \cdot B_i^S - \begin{pmatrix} b_{51} \cdot R_i^O + b_{52} \cdot G_i^O + b_{53} \cdot B_i^O + \\ b_{54} \cdot R_i^O \cdot G_i^O + b_{55} \cdot G_i^O \cdot B_i^O + \\ b_{56} \cdot B_i^O \cdot R_i^O + b_{57} \cdot R_i^{O2} + \\ b_{58} \cdot G_i^{O2} + b_{59} \cdot B_i^{O2} \end{pmatrix} \right|^2$$

$$\min \sum_{i=1}^{n} \left| B_i^S \cdot R_i^S - \begin{pmatrix} b_{61} \cdot R_i^O + b_{62} \cdot G_i^O + b_{63} \cdot B_i^O + \\ b_{64} \cdot R_i^O \cdot G_i^O + b_{65} \cdot G_i^O \cdot B_i^O + \\ b_{66} \cdot B_i^O \cdot R_i^O + b_{67} \cdot R_i^{O2} + \\ b_{68} \cdot G_i^{O2} + b_{69} \cdot B_i^{O2} \end{pmatrix} \right|^2$$

$$\min \sum_{i=1}^{n} \left| R_i^{S2} - \begin{pmatrix} b_{71} \cdot R_i^O + b_{72} \cdot G_i^O + b_{73} \cdot B_i^O + \\ b_{74} \cdot R_i^O \cdot G_i^O + b_{75} \cdot G_i^O \cdot B_i^O + \\ b_{76} \cdot B_i^O \cdot R_i^O + b_{77} \cdot R_i^{O2} + \\ b_{78} \cdot G_i^{O2} + b_{79} \cdot B_i^{O2} \end{pmatrix} \right|^2$$

$$\min \sum_{i=1}^{n} \left| G_i^{S2} - \begin{pmatrix} b_{81} \cdot R_i^O + b_{82} \cdot G_i^O + b_{83} \cdot B_i^O + \\ b_{84} \cdot R_i^O \cdot G_i^O + b_{85} \cdot G_i^O \cdot B_i^O + \\ b_{86} \cdot B_i^O \cdot R_i^O + b_{87} \cdot R_i^{O2} + \\ b_{88} \cdot G_i^{O2} + b_{89} \cdot B_i^{O2} \end{pmatrix} \right|^2$$

$$\min \sum_{i=1}^{n} \left| B_i^{S2} - \begin{pmatrix} b_{91} \cdot R_i^O + b_{92} \cdot G_i^O + b_{93} \cdot B_i^O + \\ b_{94} \cdot R_i^O \cdot G_i^O + b_{95} \cdot G_i^O \cdot B_i^O + \\ b_{96} \cdot B_i^O \cdot R_i^O + b_{97} \cdot R_i^{O2} + \\ b_{98} \cdot G_i^{O2} + b_{99} \cdot B_i^{O2} \end{pmatrix} \right|^2$$

Where, $b_{11}$ to $b_{99}$ represent coefficients of a higher order matrix of 9 by 9. Thus, the calculation may be performed to determine $b_{11}$ to $b_{99}$ when 9 expressions shown in Expression 3 become minimum, respectively.

Next, the operation of conversion coefficient calculation section 108 will be described in detail.

The conversion coefficient calculation section 108 calculates conversion matrix coefficients $c_1$ to $c_9$ for performing the conversion to approximate the object's spectral characteristics $S^R{}_\lambda$, $S^G{}_\lambda$, and $S^B{}_\lambda$ listed in a catalog etc. of the image pickup device which is to be the object for the calculation of a color conversion coefficient, which is inputted from the external I/F section 112, into target spectral characteristics $T^R{}_\lambda$, $T^G{}_\lambda$, $T^B{}_\lambda$ which is to be the target of color reproduction, by a least square method as shown in the following Expression 4.

$$\min \sum_{\lambda=400}^{700} |T_\lambda^R - (c_1 \cdot S_\lambda^R + c_2 \cdot S_\lambda^G + c_3 \cdot S_\lambda^B)|^2 \quad \text{[Expression 4]}$$

$$\min \sum_{\lambda=400}^{700} |T_\lambda^G - (c_4 \cdot S_\lambda^R + c_5 \cdot S_\lambda^G + c_6 \cdot S_\lambda^B)|^2$$

$$\min \sum_{\lambda=400}^{700} |T_\lambda^B - (c_7 \cdot S_\lambda^R + c_8 \cdot S_\lambda^G + c_9 \cdot S_\lambda^B)|^2$$

The conversion matrix coefficients $c_1$ to $c_9$ calculated by the conversion coefficient calculation section 108 are transferred to the conversion coefficient correction section 109.

It is noted that although, in Expression 4, calculation is performed on the assumption that the conversion matrix coefficients are linear matrix coefficients of 3 by 3, the conversion matrix coefficients may be matrix coefficients which include higher order terms (non-linear terms) of $S^R{}_\lambda$, $S^G{}_\lambda$, $S^B{}_\lambda$. In this case as well, the higher order matrix coefficients are calculated by a least square method as well as in the case of linear matrix coefficients. That is, the calculation of higher order matrix coefficients can be performed for example as shown in the following Expression 5.

$$\min \sum_{\lambda=400}^{700} \left| T_\lambda^R - \begin{pmatrix} d_{11} \cdot S_\lambda^R + d_{12} \cdot S_\lambda^G + d_{13} \cdot S_\lambda^B + \\ d_{14} \cdot S_\lambda^R \cdot S_\lambda^G + d_{15} \cdot S_\lambda^G \cdot \\ S_\lambda^B + d_{16} \cdot S_\lambda^B \cdot S_\lambda^R + d_{17} \cdot \\ S_\lambda^{R2} + d_{18} \cdot S_\lambda^{G2} + d_{19} \cdot S_\lambda^{B2} \end{pmatrix} \right|^2 \quad \text{[Expression 5]}$$

$$\min \sum_{\lambda=400}^{700} \left| T_\lambda^G - \begin{pmatrix} d_{21} \cdot S_\lambda^R + d_{22} \cdot S_\lambda^G + d_{23} \cdot S_\lambda^B + \\ d_{24} \cdot S_\lambda^R \cdot S_\lambda^G + d_{25} \cdot S_\lambda^G \cdot \\ S_\lambda^B + d_{26} \cdot S_\lambda^B \cdot S_\lambda^R + d_{27} \cdot \\ S_\lambda^{R2} + d_{28} \cdot S_\lambda^{G2} + d_{29} \cdot S_\lambda^{B2} \end{pmatrix} \right|^2$$

$$\min \sum_{\lambda=400}^{700} \left| T_\lambda^B - \begin{pmatrix} d_{31} \cdot S_\lambda^R + d_{32} \cdot S_\lambda^G + d_{33} \cdot S_\lambda^B + \\ d_{34} \cdot S_\lambda^R \cdot S_\lambda^G + d_{35} \cdot S_\lambda^G \cdot \\ S_\lambda^B + d_{36} \cdot S_\lambda^B \cdot S_\lambda^R + d_{37} \cdot \\ S_\lambda^{R2} + d_{38} \cdot S_\lambda^{G2} + d_{39} \cdot S_\lambda^{B2} \end{pmatrix} \right|^2$$

Where, $d_{11}$ to $d_{39}$ represent coefficients of a higher order matrix of 3 by 9. Thus, the calculation may be performed to determine $d_{11}$ to $d_{39}$ when three expressions shown in Expression 5 become minimum, respectively.

Next, the operation of the conversion coefficient correction section 109 will be described in detail.

The conversion coefficient correction section 109 performs the correction of the conversion matrix coefficients obtained from the conversion coefficient calculation section 108 by using the correction matrix coefficients obtained from the correction coefficient calculation section 106. For example, when the correction matrix coefficients are $a_1$ to $a_9$ as described above, and the conversion matrix coefficients are $c_1$ to $c_9$ as described above, the conversion coefficient correction section 109 calculates conversion matrix coefficients after correction $c'_1$ to $c'_9$ as shown in the following Expression 6.

$$\begin{pmatrix} c'_1 & c'_2 & c'_3 \\ c'_4 & c'_5 & c'_6 \\ c'_7 & c'_8 & c'_9 \end{pmatrix} = \begin{pmatrix} c_1 & c_2 & c_3 \\ c_4 & c_5 & c_6 \\ c_7 & c_8 & c_9 \end{pmatrix} \cdot \begin{pmatrix} a_1 & a_2 & a_3 \\ a_4 & a_5 & a_6 \\ a_7 & a_8 & a_9 \end{pmatrix} \quad \text{[Expression 6]}$$

Now, the procedure in which Expression 6 corresponding to a linear conversion is derived will be briefly described.

The color conversion coefficient which is originally to be determined is a color conversion coefficient for converting an RGB signal (which is referred to as an R'G'B' signal) which is obtained when an image of a certain subject is picked up by an image pickup device for which a color conversion coefficient is to be determined into an RGB signal (which is referred to as an $R^T G^T B^T$ signal) obtained when an image of the same subject is picked up by the image pickup device which is to be the target, and moreover is a color conversion coefficient which can be used when an image of an arbitrary subject is picked up. The color conversion coefficients $x_1$ to $x_9$ are represented as shown in the following Expression 7.

$$\begin{pmatrix} R^T \\ G^T \\ B^T \end{pmatrix} = \begin{pmatrix} x_1 & x_2 & x_3 \\ x_4 & x_5 & x_6 \\ x_7 & x_8 & x_9 \end{pmatrix} \begin{pmatrix} R' \\ G' \\ B' \end{pmatrix} \quad \text{[Expression 7]}$$

Here, letting a spectral distribution of an arbitrary subject be $f_\lambda$, the $R^T G^T B^T$ signal is represented as shown in the following Expression 8.

$$\begin{cases} R^T = \sum_{\lambda=400}^{700} T_\lambda^R \cdot f_\lambda \\ G^T = \sum_{\lambda=400}^{700} T_\lambda^G \cdot f_\lambda \\ B^T = \sum_{\lambda=400}^{700} T_\lambda^B \cdot f_\lambda \end{cases} \quad \text{[Expression 8]}$$

Moreover, since the image pickup device for which a color conversion coefficient is to be determined must have a different spectral characteristic from spectral characteristics $S^R_\lambda$, $S^G_\lambda$, and $S^B_\lambda$ listed in a catalog of the same model as that of the concerned image pickup device in the view point that individual differences may exist; when the spectral characteristics are represented by attaching a prime as $S'^R_\lambda$, $S'^G_\lambda$, and $S'^B_\lambda$, R', G' and B' signals are represented as shown in the following Expression 9.

$$\begin{cases} R' = \sum_{\lambda=400}^{700} S'^R_\lambda \cdot f_\lambda \\ G' = \sum_{\lambda=400}^{700} S'^G_\lambda \cdot f_\lambda \\ B' = \sum_{\lambda=400}^{700} S'^B_\lambda \cdot f_\lambda \end{cases} \quad \text{[Expression 9]}$$

Although it is desirable to determine conversion coefficients $x_1$ to $x_9$ as shown in Expression 7, it is impossible to determine a conversion coefficient which allows an accurate conversion for arbitrary subjects having various spectral distributions (or rather no conversion coefficient exists when the conversion coefficient is configured to be a constant. In reality, as it is seen when one thinks of metamerism etc., the number of the spectral distributions of a subject, from which the same R'G'B' signal is obtained, is generally not singular but plural. Therefore, when an image of such subject of plural spectral distributions is picked up by an image pickup device which is to be the target of color reproduction, it is not necessarily the case that the same $R^T G^T B^T$ signal is obtained with respect to any subject.) In addition, when the subject is arbitrary, it is also difficult to determine conversion coefficients (conversion coefficients made up of constants) $x_1$ to $x_9$ that minimizes the error of color for all the subjects.

Then, the following approximation is employed: if the conditions such as the spectral distribution of the subject and the spectral characteristic of the light source to illuminate the subject, etc. are the same, the conversion of the RGB signal obtained by the image pickup device which is the object, into the RGB signal obtained by the image pickup device which is the target can be achieved by a conversion between spectral characteristics. That is, an approximation is made such that if conversion coefficients $c'_1$ to $c'_9$ for performing the conversion between spectral characteristics as shown in the following Expression 10 are known, the conversion coefficients $c'_1$ to $c'_9$ may be used as the substitutes for the conversion coefficients $x_1$ to $x_9$ shown in Expression 7.

$$\begin{pmatrix} T_\lambda^R \\ T_\lambda^G \\ T_\lambda^B \end{pmatrix} = \begin{pmatrix} c'_1 & c'_2 & c'_3 \\ c'_4 & c'_5 & c'_6 \\ c'_7 & c'_8 & c'_9 \end{pmatrix} \cdot \begin{pmatrix} S'^R_\lambda \\ S'^G_\lambda \\ S'^B_\lambda \end{pmatrix} \quad \text{[Expression 10]}$$

By the way, since it is not realistic to measure spectral characteristics $S'^R_\lambda$, $S'^G_\lambda$, and $S'^B_\lambda$, which appear on the right hand side of Expression 10, of the image pickup device which is to be the object for the calculation of conversion coefficients, for every individual of the image pickup device, they are not known quantities in the present embodiment. At this moment, what is known are only $S^R_\lambda$, $S^G_\lambda$, and $S^B_\lambda$ which are representative spectral characteristics of the same model as that of the image pickup device which is to be the object. That is, what can be calculated are only conversion coefficients $c_1$ to $c_9$ as shown in the following Expression 11.

$$\begin{pmatrix} T_\lambda^R \\ T_\lambda^G \\ T_\lambda^B \end{pmatrix} = \begin{pmatrix} c_1 & c_2 & c_3 \\ c_4 & c_5 & c_6 \\ c_7 & c_8 & c_9 \end{pmatrix} \cdot \begin{pmatrix} S^R_\lambda \\ S^G_\lambda \\ S^B_\lambda \end{pmatrix} \quad \text{[Expression 11]}$$

Here, assume that conversion coefficients $a_1$ to $a_9$ from the spectral characteristics $S'^R_\lambda$, $S'^G_\lambda$, and $S'^B_\lambda$ of the image pickup device, which is to be the object for the calculation of conversion coefficients, to the spectral characteristic $S^R_\lambda$, $S^G_\lambda$, and $S^B_\lambda$ of the image pickup device of the same model listed in a catalog etc. become known as shown in the following Expression 12.

$$\begin{pmatrix} S^R_\lambda \\ S^G_\lambda \\ S^B_\lambda \end{pmatrix} = \begin{pmatrix} a_1 & a_2 & a_3 \\ a_4 & a_5 & a_6 \\ a_7 & a_8 & a_9 \end{pmatrix} \cdot \begin{pmatrix} S'^R_\lambda \\ S'^G_\lambda \\ S'^B_\lambda \end{pmatrix} \quad \text{[Expression 12]}$$

Then, substituting Expression 12 into Expression 11 will result in the following Expression 13.

$$\begin{pmatrix} T_\lambda^R \\ T_\lambda^G \\ T_\lambda^B \end{pmatrix} = \begin{pmatrix} c_1 & c_2 & c_3 \\ c_4 & c_5 & c_6 \\ c_7 & c_8 & c_9 \end{pmatrix} \cdot \begin{pmatrix} a_1 & a_2 & a_3 \\ a_4 & a_5 & a_6 \\ a_7 & a_8 & a_9 \end{pmatrix} \begin{pmatrix} S_\lambda'^R \\ S_\lambda'^G \\ S_\lambda'^B \end{pmatrix}$$ [Expression 13]

Comparing the Expression 13 with Expression 10 reveals that Expression 6 can be obtained. Therefore, the remaining task at this point is to determine the conversion coefficients $a_1$ to $a_9$ as shown in Expression 12.

Then, an approximation is made such that conversion coefficients $a_1$ to $a_9$ from the spectral characteristics $S'^R_\lambda$, $S'^G_\lambda$, and $S'^B_\lambda$ of the image pickup device, which is to be the object for the calculation of conversion coefficients, to the spectral characteristic $S^R_\lambda$, $S^G_\lambda$, and $S^B_\lambda$ of the image pickup device of the same model as that listed in a catalog etc. are obtained in a manner as described below.

That is, an approximation is made such that a conversion from the RGB signals (base RBG signals $R_i^O$, $G_i^O$, and $B_i^O$) obtained by picking up an image of each patch of the color chart 120 as shown in FIG. 2 by the image pickup device which is to be the object for the calculation of conversion coefficients, to the reference RGB signals $R_i^S$, $G_i^S$, and $B_i^S$ obtained based on the spectral characteristics $S^R_\lambda$, $S^G_\lambda$, and $S^B_\lambda$ of an image pickup device of the same model as that listed in a catalog etc. is performed by the conversion coefficients $a_1$ to $a_9$. This approximation is shown by Expression 2. Since the correction matrix coefficients $a_1$ to $a_9$ calculated by this Expression 2 can be used in place of the conversion coefficients which are determined by Expression 12, the calculation by Expression 6 becomes possible.

It is noted that in the case of higher order matrix coefficients as well, the flow of thinking is substantially the same as that in a linear case.

In the case of higher order matrix coefficients, each expression corresponding to Expression 6, Expression 7, Expression 10, Expression 11, Expression 12, and Expression 13 becomes as shown below, respectively.

First, Expression 6 becomes as shown in the following Expression 14.

$$\begin{pmatrix} d'_{11} & d'_{12} & \cdots & d'_{19} \\ d'_{21} & d'_{22} & \cdots & d'_{29} \\ d'_{31} & d'_{32} & \cdots & d'_{39} \end{pmatrix} = \begin{pmatrix} d_{11} & d_{12} & \cdots & d_{19} \\ d_{21} & d_{22} & \cdots & d_{29} \\ d_{31} & d_{32} & \cdots & d_{39} \end{pmatrix} \cdot \begin{pmatrix} b_{11} & b_{12} & \cdots & b_{19} \\ b_{21} & b_{22} & \cdots & b_{29} \\ \vdots & \vdots & \ddots & \vdots \\ b_{91} & b_{92} & \cdots & b_{99} \end{pmatrix}$$ [Expression 14]

Next, Expression 7 becomes as shown in the following Expression 15.

$$\begin{pmatrix} R^T \\ G^T \\ B^T \end{pmatrix} = \begin{pmatrix} x_{11} & x_{12} & \cdots & x_{19} \\ x_{21} & x_{22} & \cdots & x_{29} \\ x_{31} & x_{32} & \cdots & x_{39} \end{pmatrix} \begin{pmatrix} R' \\ G' \\ B' \\ R' \cdot G' \\ G' \cdot B' \\ B' \cdot R' \\ R'^2 \\ G'^2 \\ B'^2 \end{pmatrix}$$ [Expression 15]

Further, Expression 10 becomes as shown in the following Expression 16.

$$\begin{pmatrix} T_\lambda^R \\ T_\lambda^G \\ T_\lambda^B \end{pmatrix} = \begin{pmatrix} d'_{11} & d'_{12} & \cdots & d'_{19} \\ d'_{21} & d'_{22} & \cdots & d'_{29} \\ d'_{31} & d'_{32} & \cdots & d'_{39} \end{pmatrix} \begin{pmatrix} S_\lambda'^R \\ S_\lambda'^G \\ S_\lambda'^B \\ S_\lambda'^R \cdot S_\lambda'^G \\ S_\lambda'^G \cdot S_\lambda'^B \\ S_\lambda'^B \cdot S_\lambda'^R \\ S_\lambda'^{R2} \\ S_\lambda'^{G2} \\ S_\lambda'^{B2} \end{pmatrix}$$ [Expression 16]

Similarly, Expression 11 becomes as shown in the following Expression 17.

$$\begin{pmatrix} T_\lambda^R \\ T_\lambda^G \\ T_\lambda^B \end{pmatrix} = \begin{pmatrix} d_{11} & d_{12} & \cdots & d_{19} \\ d_{21} & d_{22} & \cdots & d_{29} \\ d_{31} & d_{32} & \cdots & d_{39} \end{pmatrix} \begin{pmatrix} S_\lambda^R \\ S_\lambda^G \\ S_\lambda^B \\ S_\lambda^R \cdot S_\lambda^G \\ S_\lambda^G \cdot S_\lambda^B \\ S_\lambda^B \cdot S_\lambda^R \\ S_\lambda^{R2} \\ S_\lambda^{G2} \\ S_\lambda^{B2} \end{pmatrix}$$ [Expression 17]

Then, Expression 12 becomes as shown in the following Expression 18.

$$\begin{pmatrix} S_\lambda^R \\ S_\lambda^G \\ S_\lambda^B \\ S_\lambda^R \cdot S_\lambda^G \\ S_\lambda^G \cdot S_\lambda^B \\ S_\lambda^B \cdot S_\lambda^R \\ S_\lambda^{R2} \\ S_\lambda^{G2} \\ S_\lambda^{B2} \end{pmatrix} = \begin{pmatrix} b_{11} & b_{12} & \cdots & b_{19} \\ b_{21} & b_{22} & \cdots & b_{29} \\ \vdots & \vdots & \ddots & \vdots \\ b_{91} & b_{92} & \cdots & b_{99} \end{pmatrix} \begin{pmatrix} S_\lambda'^R \\ S_\lambda'^G \\ S_\lambda'^B \\ S_\lambda'^R \cdot S_\lambda'^G \\ S_\lambda'^G \cdot S_\lambda'^B \\ S_\lambda'^B \cdot S_\lambda'^R \\ S_\lambda'^{R2} \\ S_\lambda'^{G2} \\ S_\lambda'^{B2} \end{pmatrix}$$ [Expression 18]

Thus, Expression 13 becomes as shown in the following Expression 19.

$$\begin{pmatrix} T_\lambda^R \\ T_\lambda^G \\ T_\lambda^B \end{pmatrix} = \begin{pmatrix} d_{11} & d_{12} & \ldots & d_{19} \\ d_{21} & d_{22} & \ldots & d_{29} \\ d_{31} & d_{32} & \ldots & d_{39} \end{pmatrix} \cdot$$ [Expression 19]

$$\begin{pmatrix} b_{11} & b_{12} & \ldots & b_{19} \\ b_{21} & b_{22} & \ldots & b_{29} \\ \vdots & \vdots & \ddots & \vdots \\ b_{91} & b_{92} & \ldots & b_{99} \end{pmatrix} \begin{pmatrix} S_\lambda'^R \\ S_\lambda'^G \\ S_\lambda'^B \\ S_\lambda'^R \cdot S_\lambda'^G \\ S_\lambda'^G \cdot S_\lambda'^B \\ S_\lambda'^B \cdot S_\lambda'^R \\ S_\lambda'^{R2} \\ S_\lambda'^{G2} \\ S_\lambda'^{B2} \end{pmatrix}$$

Where, an approximate expression to obtain the correction matrix coefficients $b_{11}$ to $b_{99}$ as shown in Expression 18 is the above described Expression 3.

Therefore, higher order matrix coefficients can also be calculated in the same manner as that for linear matrix coefficients (note that although what has been described above is an example in which up to second-order terms are taken into account, further higher order terms such as third-order and fourth-order terms, etc. can also be taken into account).

The conversion matrix coefficients after correction, which are calculated by the conversion coefficient correction section 109 in this way, are transferred to an output section 110 and are recorded and stored in a recording medium by the output section 110.

It is noted that although, in the above description, a CCD is taken as an example for the image pickup device, it is not limited to this, of course, the image pickup device may be an image pickup device of a CMOS type and other types.

Moreover, although in the above description, a single-plate image pickup device equipped with a Bayer-type primary color filter is used, the image pickup device may be, without being limited to this, a single-plate image pickup device equipped with a complementary color filter, or an image pickup device equipped with a color filter having a plurality of arbitrary color components which are independent of one another regardless whether the color filter is of a primary color or of a complementary color.

In addition, the image pickup device is not limited to a single-plate type, and may be of a 2-plate type, a 3-plate type, or a multi-plate type including more plates.

Moreover, although in the above description, a transmission-type color chart 120 is used, it is not limited to this and, for example, a reflection type color chart may also be used. In this case, in stead of a light box light source, separate external lighting equipment will be used to irradiate the color chart with illumination light.

Further, the configuration may be such that a rotary filter 130 as shown in FIG. 7 (supposing that the spectral characteristic of each filter is as shown by $O^1$ to $O^{11}$ in FIG. 3) is placed in front of a lens system 100 of an image pickup system (an image pickup system equipped with a monochrome image pickup device) and the rotary filter 130 is rotated so that video signals of each color patch are acquired in a time series fashion.

In addition, a light-emitting type color chart may also be adopted, which utilizes as the color patch, for example, a LED that emits light of an arbitrary narrow-band wavelength, and the like.

By the way, although in the above description, processing by hardware is a precondition, such configuration is not limiting. For example, a video signal from the CCD 101 may be inputted to a computer as Raw data without being processed, and the processing is performed by causing the computer to read and execute a color conversion coefficient calculation program which is separate software stored in the recording medium.

Further alternatively, without being limited to the color conversion coefficient calculation apparatus or the computer readable recording medium for recording the color conversion coefficient calculation program, a color conversion coefficient calculation method that performs similar processing may be adopted.

Referring to FIG. 8, the flow of the processing in the color conversion coefficient calculation method will be described.

Upon starting the processing, first, an unprocessed video signal is inputted, which is obtained by picking up an image of the color chart 120 by an image pickup device which is to be the object for the calculation of color conversion coefficients (step S1).

Next, a known interpolation processing is performed for the video signal obtained by step S1 to generate a video signal in a 3-plate state, and thereafter a brightness correction, etc. is performed (step S2).

Further, an average RGB signal of each color patch of the color chart 120 is calculated from the video signal obtained by step S2 (step S3). It is noted that the calculated average RGB signal is regarded as a base RGB signal.

Then, an object's spectral characteristic of the image pickup device which is to be the object of the calculation of color conversion coefficient; a target spectral characteristic of the image pickup device, which is to be the target of color reproduction; a spectral characteristic of the light source; and a spectral characteristic of each color patch of the color chart 120 are inputted respectively (step S4).

Next, based on the object's spectral characteristic, the spectral characteristic of the light source, and the spectral characteristic of the color chart 120, which are obtained by step S4, calculation of a reference RGB signal is performed for example as shown in Expression 1 (step S5).

Next, based on the base RGB signal obtained by step S3 and the reference RGB signal obtained by step S5, the calculation of a correction coefficient is performed for example as shown in Expression 2 (step S6).

Further, based on the object's spectral characteristic and the target spectral characteristic, which are obtained by step S4, a calculation of conversion coefficients is performed for example as shown in Expression 4 (step S7).

Thereafter, the conversion coefficient is corrected by multiplying the conversion coefficient obtained by step S7 by the correction coefficient obtained from step S6 for example as shown in Expression 6, (step S8), and the storage of the corrected conversion coefficient, and the like are performed thereafter ending the process.

It is noted that although, in the above description, a case in which the image pickup device employs three primary colors is taken as an example, the above described technology can be similarly applied to the cases in which the image pickup device has two primary colors and multi primary colors not less than four primary colors. Moreover, of course, the three primary colors are not limited to RGB. Further, the above described technology can be applied to, without being limited to the case in which a color conversion between image pickup devices employing the same number of primary colors is performed, a case in which for example a color conversion from a image pickup device employing four primary colors to an image pickup device employing three primary colors is performed, and the like.

According to such Embodiment 1, since a standard conversion coefficient is calculated based on an object's spectral characteristic and a target spectral characteristic, it is possible to obtain a conversion coefficient which is substantially appropriate in all the color components. Further, since configuration is made such that this standard conversion coefficient is corrected by using a correction coefficient calculated from a video signal obtained by photographing the color chart 120, it becomes possible to calculate an optimum color conversion coefficient excluding the differences among spectral characteristics of individual image pickup devices.

Moreover, the configuration to perform such processing obviates the need of measuring the spectral characteristic for every individual of the image pickup device, and also the need of preparing and picking up an image of a color chart in which various colors are arranged. Since, in place of these, it is sufficient to pick up an image of a color chart 120 in which only several color patches are disposed, information for correcting the color conversion coefficient can be easily acquired thereby allowing the process to be simplified and the manufacturing efficiency to be improved.

Moreover, when a reference color signal is calculated based on an object's spectral characteristic listed in a catalog, etc., there are advantages that the implementation is easy and calculation can be conveniently performed.

Since it is configured such that the conversion coefficient is calculated as conversion matrix coefficients and the correction coefficient is calculated as correction matrix coefficients so that corrected conversion matrix coefficients are calculated by performing a matrix operation of these matrices, implementation is easy and it becomes possible to reduce the cost of the system.

Moreover, since a color patch with a narrow wavelength bandwidth is utilized, it becomes possible to derive features of the distribution profile of the spectral characteristic with high precision.

Using a color patch of light emission type such as an LED obviates the need of separate light sources, and it becomes possible to configure a color chart of a relatively high precision at a low price.

Further, when a base color signal is obtained by picking up an image with a monochrome image pickup device via a transmission type color filter in a time series fashion, it becomes possible to easily acquire a base color signal which is compatible with a frame sequential type image pickup system.

In addition, applying a calculated color conversion coefficient to the coefficient of color conversion processing installed in an image pickup apparatus such as a digital camera, and the like makes it possible to perform a color conversion processing which is optimal to individual image pickup device in the image pickup apparatus. Thus, it is possible to provide a color conversion coefficient calculation apparatus; a computer readable recording medium that records a color conversion coefficient calculation program; and a color conversion coefficient calculation method, which can easily calculate a color conversion coefficient that can perform a high precision color conversion processing in accordance with not only the difference among models but also the difference among individuals.

Embodiment 2

Figure 9:
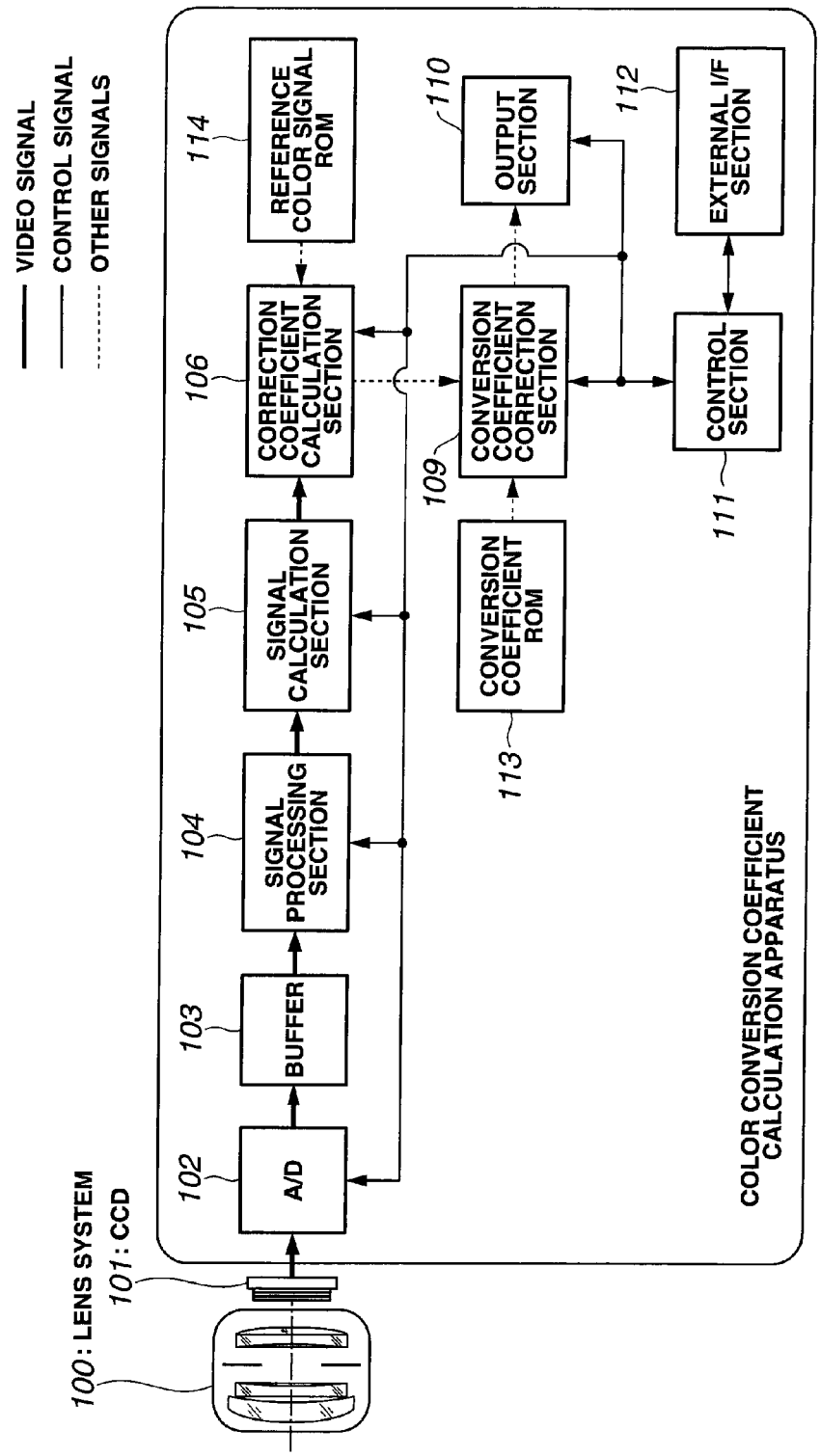
FIG. 9 is a block diagram to show the configuration of a color conversion coefficient calculation apparatus in Embodiment 2 of the present invention.

FIG. 9 which shows Embodiment 2 of the present invention is a block diagram to show the configuration of a color conversion coefficient calculation apparatus. In the Embodiment 2, like parts to those of the above described Embodiment 1 are given like reference symbols to omit the description thereof and description will be mainly made only on different points.

The color conversion coefficient calculation apparatus of the present embodiment is configured such that the conversion coefficient calculation section 108 in the color conversion coefficient calculation apparatus as shown in FIG. 1 of the above described Embodiment 1 is replaced by a conversion coefficient ROM 113, and the reference color signal calculation section 107 by a reference color signal ROM 114, respectively. Although the conversion coefficient ROM 113 is connected to the conversion coefficient correction section 109, and the reference color signal ROM 114 to the correction coefficient calculation section 106, respectively, they do not need to be directly connected with the control section 111. Other basic configurations are substantially the same as those of the Embodiment 1.

Next, part of the operation of the color conversion coefficient calculation apparatus of the present embodiment, which is different from the color conversion coefficient calculation apparatus of the Embodiment 1, will be described following the flow of signals in FIG. 9.

When the object's spectral characteristic of the image pickup device which is to be the object of the calculation of color conversion coefficient; the target spectral characteristic of the image pickup device which is to be the target of color reproduction; the spectral characteristic of the light source; and the spectral transmittance of the color patch are known in advance, it is possible to calculate a reference RGB signal and a conversion coefficient in advance. Now, suppose that the reference RGB signal thus calculated in advance is recorded in the reference color signal ROM 114, and the conversion coefficient is recorded in the conversion coefficient ROM 113. Therefore, in the configuration of the present embodiment, the procedure to input the object's spectral characteristic and the target spectral characteristic, the spectral characteristic of the light source, and the spectral transmittance of the color patch via the external I/F section 112 becomes unnecessary.

The correction coefficient calculation section 106 reads out a reference RGB signal from the reference color signal ROM 114, and calculates correction matrix coefficients $a_1$ to $a_9$, for example, based on Expression 2.

Moreover, the conversion coefficient correction section 109 reads out a predetermined conversion coefficient from the conversion coefficient ROM 113, and corrects the read out conversion coefficient with a correction matrix coefficient obtained from the correction coefficient calculation section 106 for example based on Expression 6.

The processing other than those described above is substantially the same as that of the above described Embodiment 1.

According to such Embodiment 2, substantially similar advantages to that of the above described Embodiment 1 can be achieved, and since the reference RGB signal and the conversion coefficient are recorded in a ROM, etc. in advance, time and effort to calculate the reference RGB signal and the color conversion coefficient in the color conversion coefficient calculation apparatus can be saved and, as a result, it becomes possible to calculate a color conversion coefficient efficiently and at high workability.

It is noted that the present invention is not limited to the above described embodiments as they are, and can be embodied with the elements thereof being varied while not departing from the essence thereof in an implementation stage. Moreover, various inventions may be formed by suitably combining a plurality of constituent elements disclosed in the above described embodiments. For example, some elements may be excluded from all the elements shown in the embodiments. Moreover, elements crossing over different embodiments may be suitably combined. Thus, it is a matter of course that various variations and applications are possible while not departing from the essence of the present invention.

What is claimed is:

1. A color conversion coefficient calculation apparatus for calculating a color conversion coefficient to convert a first color signal made up of a plurality of chrominance signals into a second color signal made up of a plurality of chrominance signals, the color conversion calculation apparatus comprising:
   a color conversion coefficient calculation section that calculates, as a color conversion coefficient for converting the first color signal into the second color signal, a color conversion coefficient for converting a first spectral characteristic which characterizes the first color signal in a standard fashion into a second spectral characteristic which characterizes the second color signal;
   a correction coefficient calculation section that calculates a correction coefficient for approximating a base color signal which is the first color signal corresponding to a plurality of base colors into a reference color signal obtained based on the first spectral characteristic corresponding to the plurality of base colors; and
   a coefficient correction section that corrects the color conversion coefficient by using the correction coefficient.

2. The color conversion coefficient calculation apparatus according to claim 1, wherein the color conversion coefficient calculation section calculates the color conversion coefficient as conversion matrix coefficients making up a conversion matrix with which a matrix operation can be performed on the first color signal to obtain the second color signal.

3. The color conversion coefficient calculation apparatus according to claim 2, wherein the correction coefficient calculation section calculates the correction coefficient as correction matrix coefficients making up a correction matrix with which a matrix operation can be performed on the base color signal to obtain a color signal approximate to the reference color signal.

4. The color conversion coefficient calculation apparatus according to claim 3, wherein the coefficient correction section calculates the corrected color conversion coefficient as corrected conversion matrix coefficients by performing a matrix operation with a correction matrix made up of the correction matrix coefficients on a conversion matrix made up of the conversion matrix coefficients.

5. The color conversion coefficient calculation apparatus according to claim 1, wherein the base color signal is a first color signal obtained by picking up images of color patches of a plurality of colors corresponding to the plurality of base colors, and the reference color signal is a color signal obtained based on spectral characteristics of the color patches of the plurality of colors and the first spectral characteristic.

6. The color conversion coefficient calculation apparatus according to claim 5, wherein the color patch is a color patch that emits a light in a specific narrow band.

7. The color conversion coefficient calculation apparatus according to claim 5, wherein the color patch is a color patch that transmits or reflects a light in a specific narrow band, the base color signal is a first color signal obtained by picking up images of the color patches of the plurality of colors illuminated by a light source, and the reference color signal is a color signal obtained based on spectral characteristics of the color patches of the plurality of colors, a spectral characteristic of the light source, and the first spectral characteristic.

8. The color conversion coefficient calculation apparatus according to claim 1, wherein the base color signal is a first color signal obtained by image pickup with a monochrome image pickup section through transmission-type color filters of a plurality of colors corresponding to the plurality of base colors illuminated by a light source in a time series fashion, and the reference color signal is a color signal obtained based on spectral characteristics of the transmission-type color filters of the plurality of colors, a spectral characteristic of the light source, and the first spectral characteristic.

9. The color conversion coefficient calculation apparatus according to claim 1, further comprising a spectral characteristic input section for inputting the first spectral characteristic and the second spectral characteristic.

10. A non-transitory computer readable recording medium having a color conversion coefficient calculation program recorded thereon for calculating a color conversion coefficient to convert a first color signal made up of a plurality of chrominance signals into a second color signal made up of a plurality of chrominance signals, wherein the color conversion coefficient calculation program controls operations comprising:
    a color conversion coefficient calculation step of calculating, as a color conversion coefficient to convert the first color signal into the second color signal, a color conversion coefficient for converting a first spectral characteristic which characterizes the first color signal in a standard fashion into a second spectral characteristic which characterizes the second color signal;
    a correction coefficient calculation step of calculating a correction coefficient for approximating a base color signal which is the first color signal corresponding to a plurality of base colors into a reference color signal obtained based on the first spectral characteristic corresponding to the plurality of base colors; and
    a coefficient correction step of correcting the color conversion coefficient by using the correction coefficient.

11. A color conversion coefficient calculation method for calculating a color conversion coefficient to convert a first color signal made up of a plurality of chrominance signals into a second color signal made up of a plurality of chrominance signals, wherein the color conversion coefficient calculation method comprises:
    a color conversion coefficient calculation step of calculating, as a color conversion coefficient for converting the first color signal into the second color signal, a color conversion coefficient for converting a first spectral characteristic which characterizes the first color signal in a standard fashion into a second spectral characteristic which characterizes the second color signal;
    a correction coefficient calculation step of calculating a correction coefficient for approximating a base color signal which is the first color signal corresponding to a plurality of base colors into a reference color signal obtained based on the first spectral characteristic corresponding to the plurality of base colors; and
    a coefficient correction step of correcting the color conversion coefficient by using the correction coefficient.

* * * * *